(12) United States Patent
Oh et al.

(10) Patent No.: US 8,705,852 B2
(45) Date of Patent: Apr. 22, 2014

(54) IMAGE PROCESSING APPARATUS AND METHOD FOR DEFINING DISTORTION FUNCTION FOR SYNTHESIZED IMAGE OF INTERMEDIATE VIEW

(75) Inventors: Byung Tae Oh, Seoul (KR); Du Sik Park, Suwon-si (KR); Jae Joon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 119 days.

(21) Appl. No.: 13/359,979

(22) Filed: Jan. 27, 2012

(65) Prior Publication Data

US 2012/0195501 A1    Aug. 2, 2012

(30) Foreign Application Priority Data

Jan. 27, 2011 (KR) .......................... 10-2011-0008419
Nov. 22, 2011 (KR) .......................... 10-2011-0122290
Jan. 20, 2012 (KR) .......................... 10-2012-0006758

(51) Int. Cl.
*G06K 9/34* (2006.01)
*H04N 5/232* (2006.01)

(52) U.S. Cl.
USPC ..................................... 382/164; 348/211.14

(58) Field of Classification Search
USPC ......... 382/162, 164, 168, 235, 276, 307, 195, 382/203; 348/211.14, 222.1, 557, 571, 348/437.1, 438.1, 501, 630, 708; 375/240.02, 240.024, 240.24, 240.26
See application file for complete search history.

(56) References Cited

U.S. PATENT DOCUMENTS

| | | | |
|---|---|---|---|
| 6,345,116 B1* | 2/2002 | Kojima et al. | 382/167 |
| 8,189,953 B2* | 5/2012 | Kamiya et al. | 382/275 |
| 2005/0195901 A1* | 9/2005 | Pohjola et al. | 375/240.24 |
| 2011/0255592 A1* | 10/2011 | Sung et al. | 375/240.02 |

FOREIGN PATENT DOCUMENTS

| | | |
|---|---|---|
| JP | 2004-40395 | 2/2004 |
| KR | 2003-0077985 | 10/2003 |
| KR | 10-0908123 | 7/2009 |
| KR | 10-2010-0075351 | 7/2010 |

\* cited by examiner

*Primary Examiner* — Abolfazl Tabatabai
(74) *Attorney, Agent, or Firm* — Staas & Halsey LLP

(57) ABSTRACT

An apparatus and method for processing an image are provided. The apparatus may determine a distortion region based on warped pixels in a synthesized image of an intermediate view; and define a surface area of the distortion region as a distortion function of the synthesized image.

25 Claims, 8 Drawing Sheets

IMAGE PROCESSING APPARATUS AND METHOD FOR DEFINING DISTORTION FUNCTION FOR SYNTHESIZED IMAGE OF INTERMEDIATE VIEW

CROSS-REFERENCE TO RELATED APPLICATIONS

This application claims the benefit of Korean Patent Application No. 10-2011-0008419, filed on Jan. 27, 2011, No. 10-2011-0122290, filed on Nov. 22, 2011 and No. 10-2012-0006758, filed on Jan. 20, 2012, in the Korean Intellectual Property Office, the disclosure of which is incorporated herein by reference.

BACKGROUND

1. Field

Example embodiments of the following description relate to an image processing apparatus and method, and more particularly, to an apparatus and method for defining a distortion function based on a distortion region, by determining the distortion region with respect to a synthesized image of an intermediate view.

2. Description of the Related Art

A depth image refers to an image indicating depth information of a corresponding color image. In a 3-dimensional video (3DV) system, the depth image is used as additional information for synthesis of an intermediate image of at least two color images. When compressing the depth image, it is more desirable to measure a distortion amount at a view for synthesis of the images rather than to measure distortion of the depth image. Therefore, all experiments for depth image compression are currently performed according to the former method.

Here, there is a need for a new distortion function reflecting characteristics of the synthesized image to predict a distortion function value approximate to an actual value.

SUMMARY

The foregoing and/or other aspects are achieved by providing an image processing apparatus including a distortion region determining unit to determine a distortion region based on warped pixels in a synthesized image of an intermediate view, and a distortion function defining unit to define a surface area of the distortion region as a distortion function of the synthesized image.

The foregoing and/or other aspects are achieved by providing an image processing method including determining a distortion region based on warped pixels in a synthesized image of an intermediate view, and defining a surface area of the distortion region as a distortion function of a synthesized image.

Additional aspects, features, and/or advantages of example embodiments will be set forth in part in the description which follows and, in part, will be apparent from the description, or may be learned by practice of the disclosure.

EFFECTS

According to example embodiments, a distortion function of a synthesized image of an intermediate view may be accurately calculated. Accordingly, generation of bits may be reduced during compression of a depth image.

According to example embodiments, since the distortion function of the synthesized image is accurately calculated, quality of the synthesized image may increase.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Reference will now be made in detail to example embodiments, examples of which are illustrated in the accompanying drawings, wherein like reference numerals refer to the like elements throughout. Example embodiments are described below to explain the present disclosure by referring to the figures.

Figure 1:
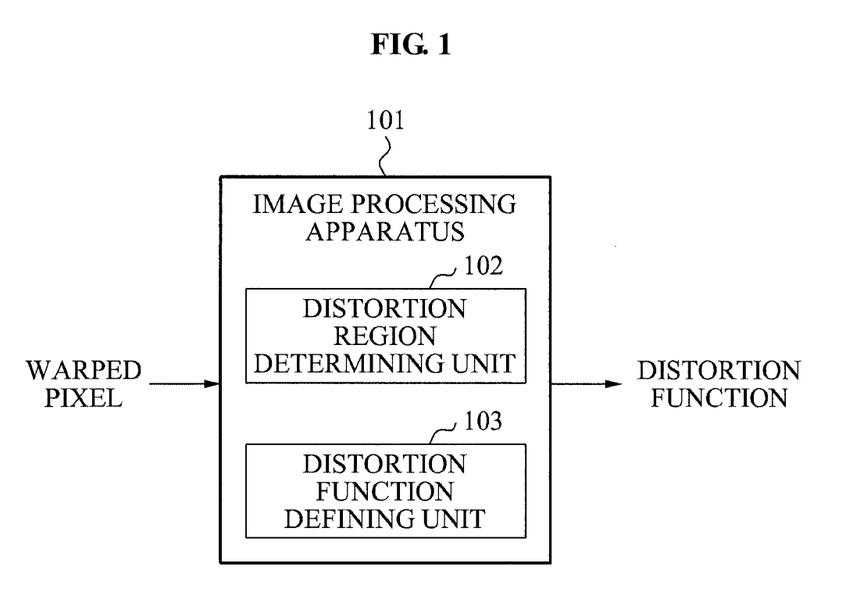
FIG. 1 illustrates a diagram showing a structure of an image processing apparatus in detail, according to example embodiments.

FIG. 1 illustrates a diagram showing a structure of an image processing apparatus 101 in detail, according to example embodiments.

Referring to FIG. 1, the image processing apparatus 101 may include a distortion region determining unit 102 and a distortion function defining unit 103.

The distortion region determining unit 102 may determine a distortion region based on warped pixels in a synthesized image of an intermediate view. The distortion region may be generated when actual values of the warped pixels are determined to be values other than expected values due to encoding and decoding of a color image or encoding and decoding of a depth image.

For example, the distortion region determining unit 102 may determine the distortion region using an error of a color image and an error of the depth image. That is the error generated along a y-axis and the error generated along an x-axis, respectively. Here, the distortion region determining unit 102 may determine the distortion region by linearly interpolating the warped pixels. Through the linear interpolation, a simplified distortion region may be determined.

The distortion function defining unit 103 may define a surface area of the distortion region as a distortion function of the synthesized image. For example, the distortion function defining unit 103 may calculate the surface area of the distortion region, using a surface area of triangles constituting the distortion region generated by linear interpolation of the warped pixels. Since the distortion region is thus simplified into the triangles, definition of the distortion function may be facilitated.

In addition, the distortion function defining unit 103 may define the distortion function of the synthesized image, using the surface area of the distortion region based on one of the warped pixels. Here, the distortion function defining unit 103 may define the surface area of the distortion region based on a warped color image pixel among the warped pixels. Since a plurality of the warped pixels is not processed at one time but the surface area of the distortion region is calculated per the warped pixel, definition of the distortion function may be facilitated.

In addition, the distortion function defining unit 103 may define a distortion function value of the synthesized image based on a position of a warped depth image. For example, the distortion function defining unit 103 may define the distortion function to be zero when the warped depth image is located in an occluded region. Example embodiments may sufficiently consider the occluded region or a hole region that may occur in the synthesized image of the intermediate view.

Distortion described with reference to FIGS. 2 to 7 according to example embodiments corresponds to the distortion function described with reference to FIG. 1.

Figure 2:
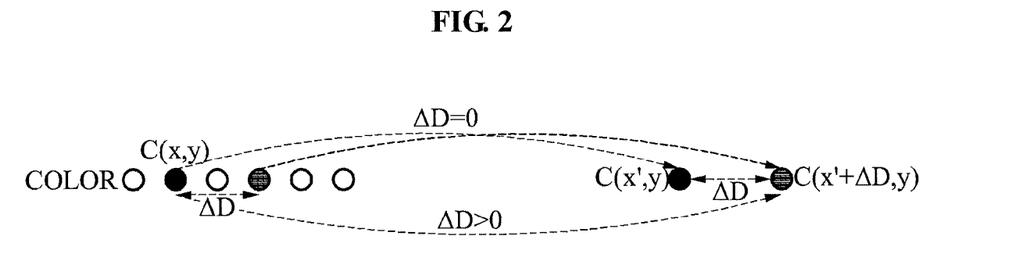
FIG. 2 illustrates a diagram describing a method of determining a distortion function, according to example embodiments.

FIG. 2 illustrates a diagram describing a method of determining a distortion function, according to example embodiments.

An intermediate image V, also called a ground truth, is a synthesized image of an original color image C and an original depth image D, synthesized by a warping function $f_w$. An intermediate image V' is a synthesized image of a color image C' and a depth image D' both generated by encoding and decoding. Distortion of the synthesized image of the intermediate view may be obtained by calculating a difference between the intermediate image V and the intermediate image V'.

The distortion of the synthesized image of the intermediate view may be calculated by Equation 1 as follows.

$$D_{syn} = \sum_x \sum_y [f_w(C, D) - f_w(C', D')]^p \quad \text{[Equation 1]}$$
$$= \sum_{x'} \sum_{y'} [V(x', y') - V'(x', y')]^p$$

In Equation 1, $D_{syn}$ denotes the distortion of the synthesized image of the intermediate view, C denotes the original color image, D denotes the original depth image, C' denotes a color image generated by encoding and decoding, and D' denotes a depth image generated by encoding and decoding. Here, the color image C' may refer to a result of including a noise of a color image generated by encoding or decoding in the original color image C. The depth image D' may refer to a result of including a noise of a depth image generated by encoding or decoding in the original depth image D. In addition, V denotes an intermediate image obtained by synthesizing the original color image C and the original depth image D using the warping function $f_w$. V' denotes an intermediate image obtained by synthesizing the color image C' and the depth image D' using the warping function $f_w$.

As can be appreciated from Equation 1, an actual disparity error of the depth image may have a linear relationship with a depth error of the depth image.

The disparity error of the depth image may be determined by Equation 2 as follows.

$$\Delta D = a \cdot \delta_x \cdot \frac{\Delta \text{Depth}}{255} \left( \frac{1}{Z_{near}} - \frac{1}{Z_{far}} \right) = k \cdot \Delta \text{Depth} \quad \text{[Equation 2]}$$

In Equation 2, $\Delta D$ denotes the disparity error of the depth image, and $\Delta$depth denotes the depth error of the depth image, caused by the noise generated during the encoding and decoding. $\alpha$ denotes a parameter determined by a setting value of a camera, and $\delta_x$ denotes a distance between a currently encoded view and the view of the synthesized image.

Accordingly, the distortion of the synthesized image of the intermediate view may be calculated by Equation 3 as follows.

$$D_{syn} = \sum_x \sum_y [C(x, y) - C'(x + \Delta D(x, y), y)]^p \quad \text{[Equation 3]}$$

Here, $D_{syn}$ denotes the distortion of the synthesized image of the intermediate view, C denotes the original color image, and C' denotes a color image obtained by including a noise of a color image generated by encoding or decoding in the original color image C. C(x,y) denotes a pixel of the original color image C. $\Delta D$ denotes a disparity error of the depth image and p denotes a random value.

FIG. 2 shows a simplified form of Equation 3. Here, a pixel C(x, y) of a certain color image needs to be moved to a pixel C(x', y) in the synthesized image of the intermediate view by a depth value D(x, y). However, the depth value D(x, y) is changed to D'(x, y) due to an encoding and decoding error. Accordingly, due to an error of the depth value D(x,y), the pixel C(x, y) may be actually moved to (x'+$\Delta D$(x, y), y) rather than to (x', y). Here, $\Delta D$(x,y) refers to a difference between D(x,y) and D'(x,y).

Therefore, according to Equation 3, the distortion of the synthesized image of the intermediate view may be defined as a difference between the pixel C(x,y) of the color image moving to the pixel C(x',y) and the pixel C'(x+$\Delta D$(x,y), y) of the color image moving to (x'+$\Delta D$(x,y), y).

Figure 3:
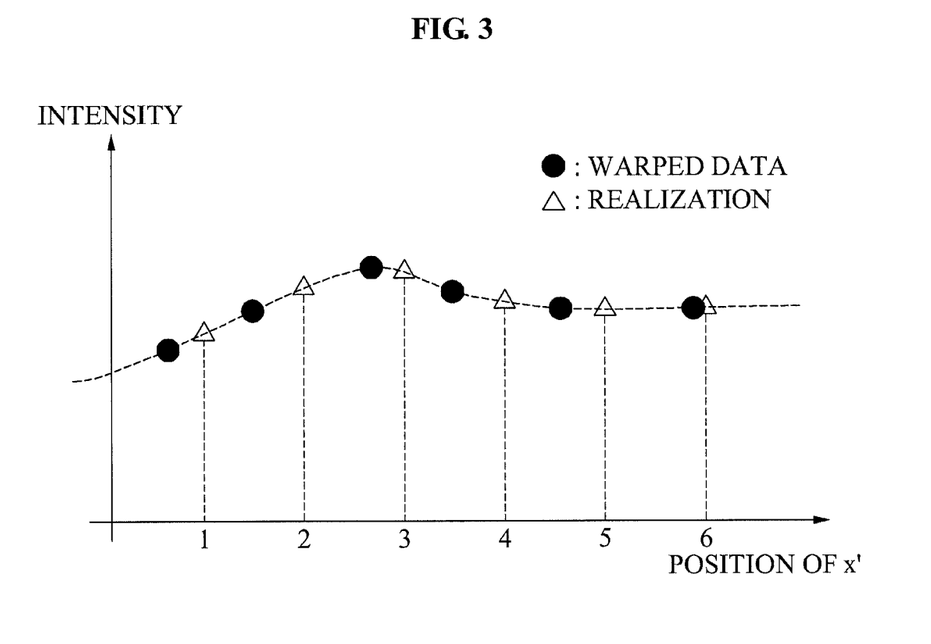
FIG. 3 illustrates a graph describing a process of generating a synthesized image of an intermediate view, according to example embodiments.

FIG. 3 illustrates a graph describing a process of generating a synthesized image of an intermediate view, according to example embodiments.

Referring to FIG. 3, with regard to pixels $C_1 \ldots C_n$ of a row of color images and pixels $D_1 \ldots D_n$ of a row of depth images, pixels $C_k$ of the respective color images are warped by pixels $C_k$ of the corresponding depth images.

After the warping, the respective pixels may not accurately correspond to an integer grid shown by a dotted line in FIG. 3, in the synthesized image of the intermediate view. Referring to FIG. 3, interpolated values are actually reflected on the integer grid.

Figure 4:
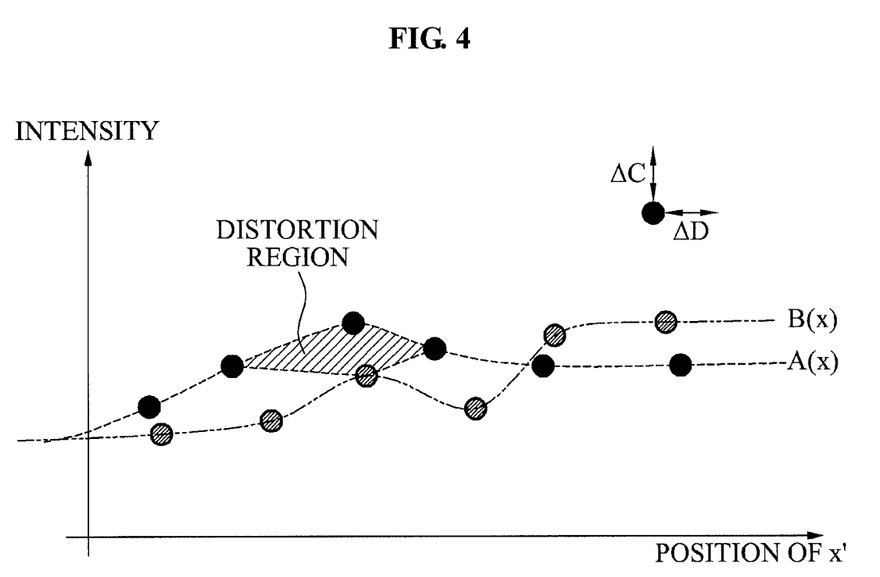
FIG. 4 illustrates a graph showing a distortion region of a synthesized image of an intermediate view, according to example embodiments.

FIG. 4 illustrates a graph showing a distortion region of a synthesized image of an intermediate view, according to example embodiments.

Presuming that pixels $C'_1 \ldots C'_n$ of the color images are changed to pixels $D'_1 \ldots$ to $D'_n$ of the depth images due to the encoding and decoding operation, pixel values may be warped to different values other than expected values due to the encoding and decoding error as show in FIG. 4.

Here, an error caused by encoding and decoding of the color images from the warped values, that is $^\Delta C_k = C_k - C'_k$, changes the pixel values in the y-axis direction. An error caused by encoding and decoding of the depth images, that is $\Delta D_k = D_k - D'_k$, changes the pixel value in the x-axis direction.

Referring to FIG. 4, a curve A(x) after warping and interpolation by original image information may be changed to a curve B(x) due to the encoding and decoding error. A region between the curve A(x) and the curve B(x) may be defined as the distortion region.

Distortion of the synthesized image of the intermediate view may be determined by Equation 4 as follows.

$$D_{syn} = \int |A(x) - B(x)|^p dx \quad \text{[Equation 4]}$$

In Equation 4, $D_{syn}$ denotes the distortion of the synthesized image of the intermediate view. That is, according to Equation 4, when a curve A(x) denoting an original image warped and then interpolated is changed to a curve B(x) to which the encoding or decoding error is reflected, the distortion of the synthesized image of the intermediate view may be determined by a surface area of the distortion region between the curve A(x) and the curve B(x). Here, p denotes a random value.

Figure 5:
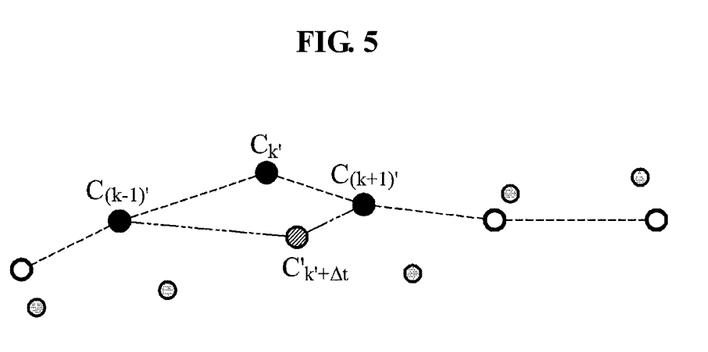
FIG. 5 illustrates a diagram showing a distortion region of a synthesized image of an intermediate view, deduced by linear interpolation, according to example embodiments.

FIG. 5 illustrates a diagram showing a distortion region of a synthesized image of an intermediate view, deduced by linear interpolation, according to example embodiments.

FIG. 5 shows a result of simplifying FIG. 4 according to an interpolation method. Using a straight line simplified from a curve, as shown in FIG. 5 according to the interpolation method, calculation of the surface area of the distortion region of the synthesized image of the intermediate view may be facilitated.

In FIG. 5, linear interpolation is performed to obtain a surface area of the distortion region. By the linear interpolation, the curve shown in FIG. 4 becomes a straight line connecting two points by the linear interpolation as shown in FIG. 5.

According to the example embodiments, instead of processing a plurality of the pixel values forming the curve at one time, distance values are obtained per pixel and then squared and added.

In FIG. 5, an error is considered, which is generated as a current pixel value $(C_k, D_k)$ changes to $(C'_k, D'_k)$ by encoding or decoding. That is, the region shown in FIG. 5 is generated due to the error generated in a pixel in a position k. Here, when the linear interpolation is applied to the curve, the error of a pixel in a particular position may affect surrounding pixels of the pixel in the particular position. That is, when the error occurs in the position k, the error may affect values of pixels located in positions (k−1) and (k+1).

As a result, the distortion caused by the pixel in the position k may be determined as a surface area of the distortion region generated by the error of the pixel in the position k.

That is, the distortion based on the pixel in the position k may be determined by Equation 5 as follows.

$$\Delta D_{syn}(k) = \int_{k-1}^{k+1} |A(k) - B(k)| dk \quad \text{[Equation 5]}$$

In Equation 5, $\Delta D_{syn}$ denotes the distortion of the synthesized image of the intermediate view. k, k−1, and k+1 denote positions of pixels. A(K) denotes a value of the position k on a linearly interpolated curve A(X). B(K) denotes a value of the position k on a linearly interpolated curve B(X).

Accordingly, final distortion in all pixels located on the linearly interpolated curve may be determined according to Equation 6 as follows.

$$D_{syn} = \sum_k |\Delta D_{syn}(k)|^p \quad \text{[Equation 6]}$$

According to Equation 6, the final distortion $D_{syn}$ may be deduced by adding all $\Delta D_{syn}$ generated by the errors in the respective pixels located on the linearly interpolated curve. Here, p denotes a random value.

Figure 6:
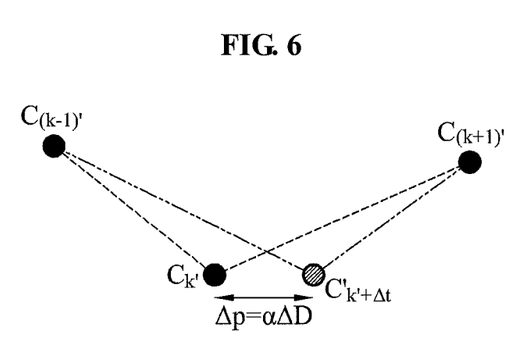
FIG. 6 illustrates a diagram showing a process of defining a distortion function of a synthesized image of an intermediate view, according to example embodiments.

FIG. 6 illustrates a diagram showing a process of defining a distortion function of a synthesized image of an intermediate view, according to example embodiments.

FIG. 6 shows a process of calculating Equation 5 described above more simply. When only decoded color images C' are used without using the original color image C, the error $(\Delta P = \alpha \Delta D)$ is generated only in the y-axis direction. Therefore, the surface area of the distortion region caused by the error of the pixel in the position k may be determined as a surface area of a triangle constituted by pixels in the positions k, k−1, and k+1 constituting the decoded color image C'.

Accordingly, the surface area of the distortion region of FIG. 6 may be expressed by Equation 7 as follows.

$$D_{syn} \approx \tfrac{1}{2} \cdot 1 \cdot (h_1 + h_2) = \tfrac{1}{2} \cdot \alpha \cdot \Delta D \cdot [|C'(k-1) - C'(k)| + |C'(k) - C'(k+1)|] \quad \text{[Equation 7]}$$

In Equation 7, $D_{syn}$ denotes distortion caused by the error of the pixel in the position k in FIG. 6. C' denotes the decoded color image. AD may be deduced using Equation 2.

In Equation 7, the decoded color image is used for calculating distortion based on the distortion region. However, the decoded color image may be replaced by other similar information. For example, the original color image may be used instead of the decoded color image. Alternatively, the original color image to which a particular filter is applied may be used instead of the decoded color image. Here, the filter and a filter parameter may be determined more accurately based on relations between the original color image of a neighboring view and the decoded color image.

Figure 7:
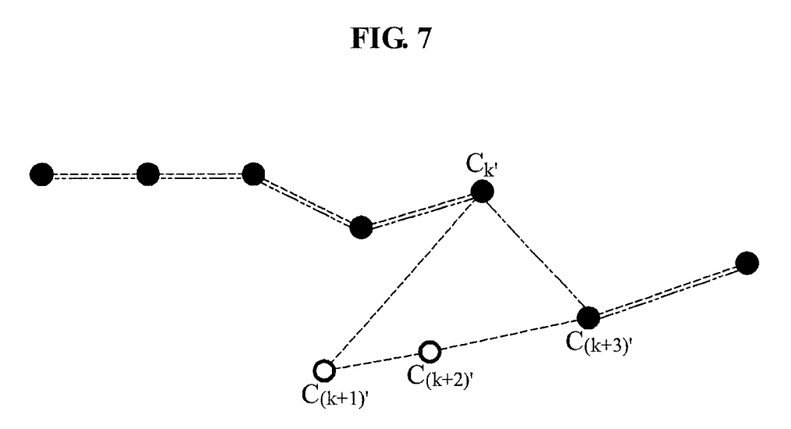
FIG. 7 illustrates a diagram describing a distortion function value based on an occluded region, according to example embodiments.

FIG. 7 illustrates a diagram describing a distortion function value based on an occluded region, according to example embodiments.

As described above, it is presumed that neighboring pixels of the current pixel in the position k on the curve B(x) are located in positions (k−1) and (k+1). However, during the actual warping, it is required to confirm whether the neighboring pixels located in the positions (k−1) and (k+1) are actually neighboring pixels of the current pixel located in the position k, with respect to the pixel of the color image.

Referring to FIG. 7, the pixel value of the color image affected next to the current pixel C(x, y) by the warping becomes C(x+3, y) instead of C(x+1, y). According to the example embodiments, the distortion region may be expressed in consideration of influences by the occluded region and the hole region after the warping is actually performed, according to Equation 8 below.

$$D_{syn} = \quad \text{[Equation 8]}$$
$$\begin{cases} \tfrac{1}{2} \cdot \alpha \cdot \Delta D \cdot [|C''(k) - C'(k_\perp)| + |C''(k) - C''(k_K)|] & k_\perp < 0 \\ 0 & k_\perp \geq 0 \end{cases}$$

In Equation 8, $D_{syn}$ denotes distortion caused by the error of the pixel in the position k in FIG. 7. C' denotes the decoded color image. AD may be deduced using Equation 2.

Here, $k_L$ and $k_R$ are determined by Equation 9 as follows.

$$\begin{cases} k_L = k + \underset{l \geq 1}{\operatorname{argmax}}[\alpha(D_{k-l} - D_k) - l] \\ k_R = k + \underset{r \geq 1}{\operatorname{argmin}}[\max(\alpha(D_{k+r} + D_k) + r, 0)] \end{cases}$$ [Equation 9]

argmin → argmin

In Equation 9, $k_L$ denotes a position (from k−1 to k−1) of a pixel located on the left of the position k in the case where an error occurs in the pixel in the position k. In addition, $k_R$ denotes a position (from k+1 to k+r) of a pixel located on the left of the position k.

In Equation 9, the distortion region becomes zero when the current pixel value is located in the occluded region after the warping. Since $k_L$ becomes greater than zero in this case, the distortion function of the synthesized image may be set to zero.

View synthesis distortion (VSD) which means distortion of the synthesized image of the intermediate view may replace or be used along with existing distortion such as sum of squared distortion (SSD) or sum of absolute distortion (SAD). For example, a finally used distortion value may be determined by Equation 10.

$$\text{Dist} = \omega \cdot VSD + (1-\omega) \cdot SSD$$ [Equation 10]

In Equation 10, Dist denotes finally used distortion, VSD denotes the distortion of the synthesized image of the intermediate view, and SSD denotes the existing distortion. ω denotes a weight greater than zero and smaller than 1.

In addition, a Lagrangian multiplier $\lambda_V$ applied to a VSD-based rate-distortion cost function may be set different from a Lagrangian multiplier $\lambda_D$ applied to an SSD-based rate-distortion cost function. In this case, the VSD-based cost function and the SSD-based cost function may both be considered in deducing a final rate-distortion cost function J.

For example, the final rate-distortion cost function J may be expressed as a weighted sum of an SSD-based cost function $J_D$ and a VSD-based cost function as shown in Equation 11.

$$\begin{aligned} J &= \omega \cdot J_V + (1-\omega) \cdot J_D \\ &= \omega \cdot (VSD + \lambda_V R) + (1-\omega) \cdot (SSD + \lambda_D R) \\ &= [\omega \cdot VSD + (1-\omega) \cdot SSD] + [\omega \cdot \lambda_V + (1-\omega) \cdot \lambda_D] \cdot R \end{aligned}$$ [Equation 11]

In Equation 11, J denotes the rate-distortion cost function, and w denotes a weight greater than zero and smaller than 1. VSD denotes the distortion of the synthesized image of the intermediate view and SSD denotes the existing distortion. $\lambda_V$ denotes the Lagrangian multiplier applied to the VSD-based rate-distortion cost function. $\lambda_D$ denotes the Lagrangian multiplier applied to the SSD-based rate-distortion cost function.

The rate-distortion cost function obtained by Equation 11 may be varied according to the view of the synthesized image. When the synthesized image has at least two views, a final rate-distortion cost function may be determined as a weighted sum of cost functions obtained in the respective views of the synthesized image.

Figure 8:
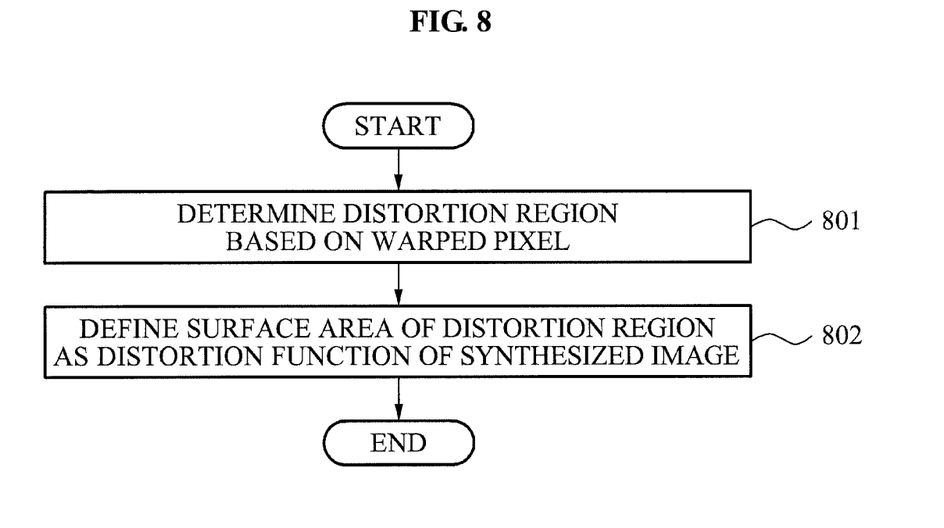
FIG. 8 illustrates a flowchart describing an image processing method according to example embodiments.

FIG. 8 illustrates a flowchart describing an image processing method according to example embodiments.

In operation 801, an image processing apparatus 101 may determine a distortion region based on warped pixels in a synthesized image of an intermediate view. More specifically, the distortion region may be generated when actual values of the warped pixels are determined to be values other than expected values due to encoding and decoding of a color image or encoding and decoding of a depth image.

For example, the image processing apparatus 101 may determine the distortion region using an error of a color image, the error generated along a y-axis, and an error of the depth image, the error generated along an x-axis in FIG. 4. Here, the image processing apparatus 101 may determine the distortion region by linearly interpolating the warped pixels. Through the linear interpolation, a simplified distortion region may be determined.

In operation 802, the image processing apparatus 101 may define a surface area of the distortion region as a distortion function of the synthesized image. For example, the image processing apparatus 101 may calculate the surface area of the distortion region, using surface areas of triangles constituting the distortion region generated by linear interpolation of the warped pixels. Since the distortion region is thus simplified into the triangles, definition of the distortion function may be facilitated.

In addition, the image processing apparatus 101 may define the distortion function of the synthesized image, using the surface area of the distortion region based on one of the warped pixels. Here, the image processing apparatus 101 may define the surface area of the distortion region based on a warped color image pixel among the warped pixels. Since a plurality of the warped pixels is not processed at one time but the surface area of the distortion region is calculated per the warped pixel, definition of the distortion function may be facilitated.

Also, the image processing apparatus 101 may define a distortion function value of the synthesized image based on a position of a warped depth image. For example, the image processing apparatus 101 may define the distortion function as zero when the warped depth image is located in an occluded region. Example embodiments may sufficiently consider the occluded region or a hole region that may occur in the synthesized image of the intermediate view.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. An image processing apparatus comprising:
    a distortion region determining unit to determine a distortion region based on warped pixels in a synthesized image of an intermediate view; and
    a distortion function defining unit to define a distortion function of the synthesized image based on a surface area of the distortion region,
    wherein the synthesized image of the intermediate view is generated based on at least one color image and one depth image.

2. The image processing apparatus of claim 1, wherein the distortion region determining unit determines the distortion region by linearly interpolating the warped pixels.

3. The image processing apparatus of claim 2, wherein the distortion function defining unit calculates the surface area of the distortion region using surface areas of triangles constituting the distortion region generated by linear interpolation of the warped pixels.

4. The image processing apparatus of claim 1, wherein the distortion region determining unit determines the distortion region using a color image error generated along a y-axis, and a depth image error generated along an x-axis.

5. The image processing apparatus of claim 1, wherein the distortion function defining unit defines a surface area of the distortion region based on one of the warped pixels, as the distortion function of the synthesized image.

6. The image processing apparatus of claim 5, wherein the distortion function defining unit defines a surface area of the distortion region based on a warped color image pixel among the warped pixels, as the distortion function of the synthesized image.

7. The image processing apparatus of claim 1, wherein the distortion function defining unit defines the surface area of the distortion region as the distortion function of the synthesized image, using at least one selected from a decoded color image, an original color image, and a color image obtained by applying a filter to the original color image.

8. The image processing apparatus of claim 1, wherein the distortion function defining unit defines a final distortion function based on a weighted sum of the distortion function of the synthesized image deduced from respective views of the synthesized image when the synthesized image has a plurality of views.

9. The image processing apparatus of claim 1, wherein the distortion function defining unit defines a distortion function value of the synthesized image, based on a position of a warped depth image pixel.

10. The image processing apparatus of claim 1, wherein the distortion function defining unit defines the distortion function as zero when a warped depth image pixel is located in an occluded region.

11. The image processing apparatus of claim 1, wherein the image processing apparatus determines a final distortion function used for image encoding, using a distortion function of at least one color image and the distortion function of the synthesized image of the intermediate view.

12. The image processing apparatus of claim 11, wherein the image processing apparatus determines a final distortion function using Lagrangian multipliers applied to the distortion function of the at least one color image and the distortion function of the synthesized image.

13. An image processing method comprising:
determining, by way of a processor, a distortion region based on warped pixels in a synthesized image of an intermediate view; and
defining a distortion function of a synthesized image based on a surface area of the distortion region,
wherein the synthesized image of the intermediate view is generated based on at least one color image and one depth image.

14. The image processing method of claim 13, wherein the determining of the distortion region determines the distortion region by linearly interpolating the warped pixels.

15. The image processing method of claim 14, wherein the defining of the distortion function calculates a surface area of the distortion region using surface areas of triangles constituting the distortion region generated by linear interpolation of the warped pixels.

16. The image processing method of claim 13, wherein the determining of the distortion region determines the distortion region using a color image error generated along a y-axis, and a depth image error generated along an x-axis.

17. The image processing method of claim 13, wherein the defining of the distortion function defines a surface area of the distortion region based on one of the warped pixels, as the distortion function of the synthesized image.

18. The image processing method of claim 17, wherein the defining of the distortion function defines a surface area of the distortion region based on a warped color image pixel among the warped pixels, as the distortion function of the synthesized image.

19. The image processing method of claim 13, wherein the defining of the surface area of the distortion region comprises defining the surface area of the distortion region as the distortion function of the synthesized image, using at least one selected from a decoded color image, an original color image, and a color image obtained by applying a filter to the original color image.

20. The image processing method of claim 13, wherein the defining of the surface area of the distortion region comprises defining a final distortion function based on a weighted sum of the distortion function of the synthesized image deduced from respective views of the synthesized image when the synthesized image has a plurality of views.

21. The image processing method of claim 13, wherein the defining of the distortion function defines a distortion function value of the synthesized image, based on a position of a warped depth image pixel.

22. The image processing method of claim 13, wherein the defining of the distortion function defines the distortion function as zero when a warped depth image pixel is located in an occluded region.

23. The image processing method of claim 13, further comprising determining a final distortion function used for image encoding, using a distortion function of at least one color image and the distortion function of the synthesized image of the intermediate view.

24. The image processing method of claim 13, wherein the image processing method determines a final distortion function using Lagrangian multipliers applied to the distortion function of the at least one color image and the distortion function of the synthesized image.

25. A non-transitory computer readable recording medium storing a program to cause a computer to implement the method of claim 13.

* * * * *